United States Patent [19]

Jean et al.

[11] 4,364,611
[45] Dec. 21, 1982

[54] SEPARATE 3-CYLINDER SYSTEM OF BRAKE FLUID FOR AUTOMOBILE SAFETY

[76] Inventors: Ming T. Jean; Ming T. Liou, both of No. 2, Alley, 31, La. 465, Jean Chyan St., Shuh Lin Chyan, Taipei Hsian, Taiwan

[21] Appl. No.: 182,307

[22] Filed: Aug. 26, 1980

[51] Int. Cl.³ ............................................. B60T 17/18
[52] U.S. Cl. ................................... 303/84 R; 60/458; 303/52
[58] Field of Search ............ 303/6 R, 52, 84 A, 84 R; 60/403, 458, 484, 713

[56] References Cited

U.S. PATENT DOCUMENTS

| | | | |
|---|---|---|---|
| 2,879,791 | 3/1959 | Hollmann | 303/84 A X |
| 2,899,024 | 8/1959 | Hamilton et al. | 303/84 A |
| 2,921,440 | 1/1960 | Feibush | 303/84 A X |
| 3,166,906 | 1/1965 | Zala | 303/84 A X |
| 3,227,494 | 1/1966 | Alfieri | 303/52 X |
| 3,319,742 | 5/1967 | Cumming | 303/84 R X |
| 3,328,959 | 7/1967 | Hackett | 303/84 R X |
| 3,345,112 | 10/1967 | Kershner | 303/6 R |
| 3,605,410 | 9/1971 | Herriot | 303/6 R X |
| 3,817,583 | 6/1974 | Blakey | 303/6 R |

*Primary Examiner*—Duane A. Reger
*Attorney, Agent, or Firm*—Cushman, Darby & Cushman

[57] ABSTRACT

A vehicle pressing cylinder, such as, for an automobile, installed between a master cylinder and the wheel cylinders thereof comprises a body defining three cylinders, e.g. a front cylinder, and right and left rear cylinders, the front cylinder having a larger bore than each of the right and left rear cylinders, a panel member covering one end of the body having passageways to concurrently direct brake fluid to each of the three body cylinders, and pistons reciprocably mounted in each of the three body cylinders. Means are provided repair any of the three body cylinders upon damage to brake lines and discrete warning means are provided to warn the vehicle operator of such damaged brake lines.

7 Claims, 10 Drawing Figures

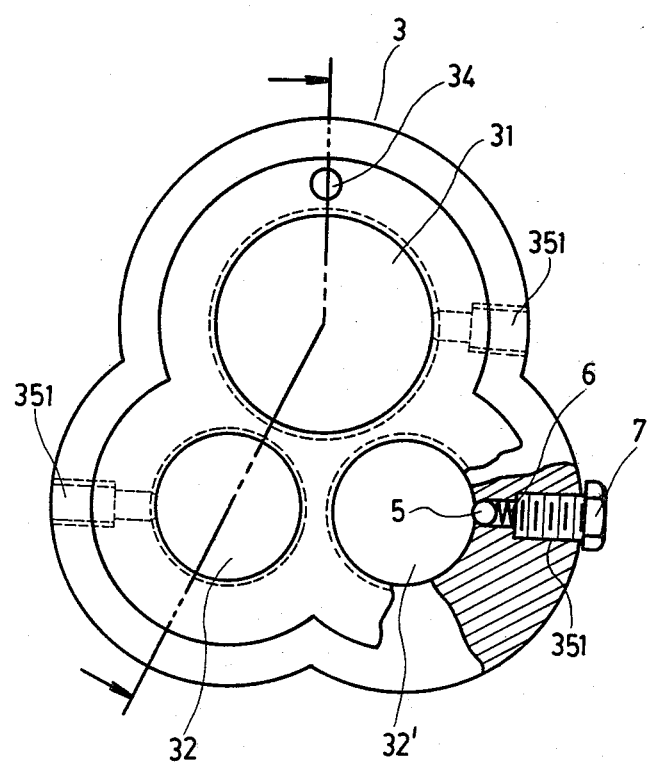
Fig. 2-A

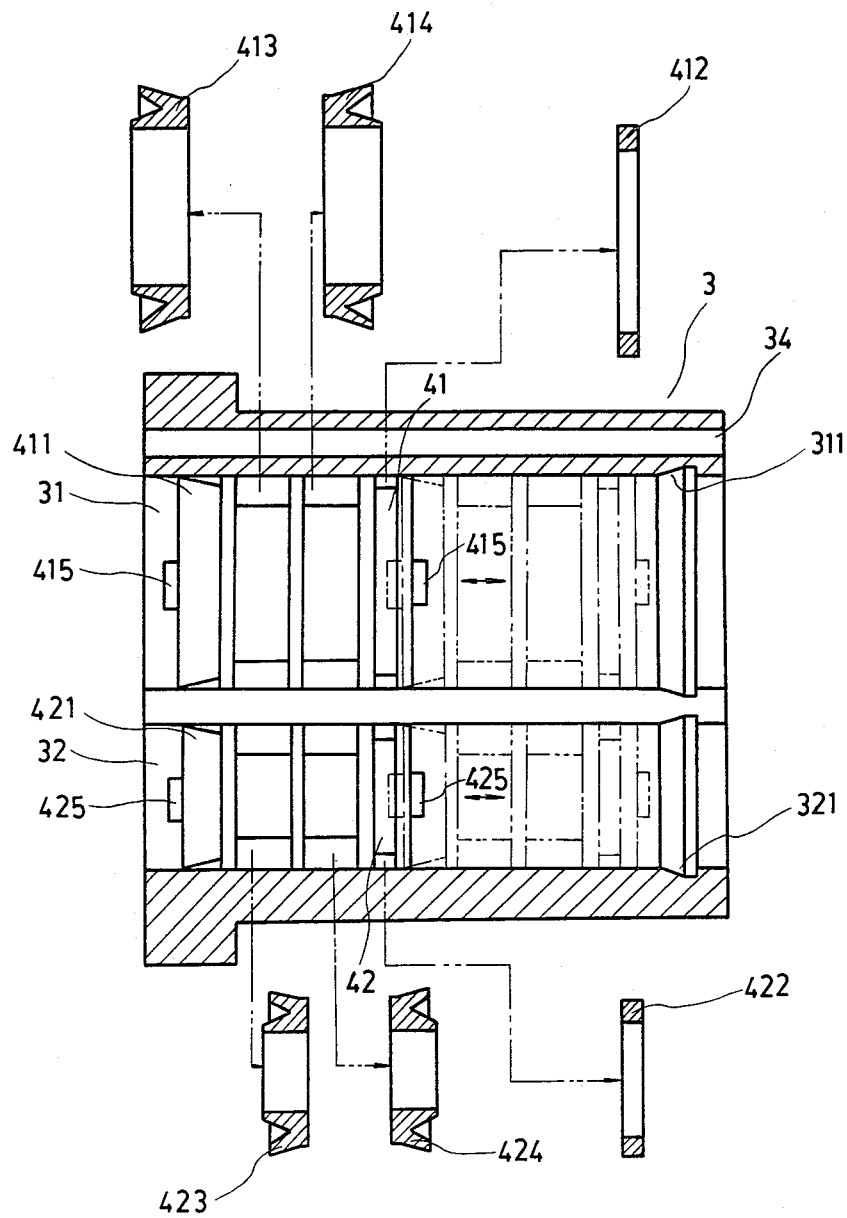
Fig. 2-B

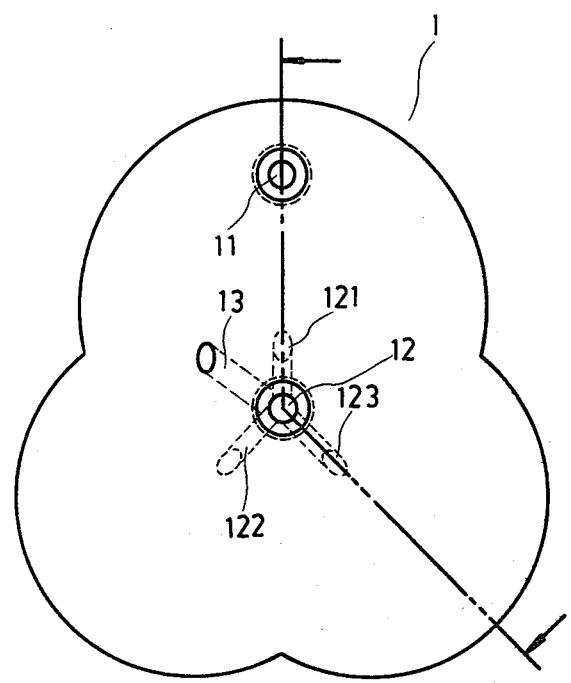
Fig. 3-A
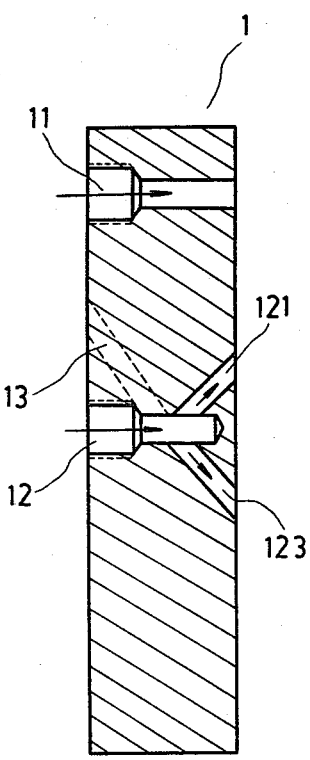
Fig. 3-B

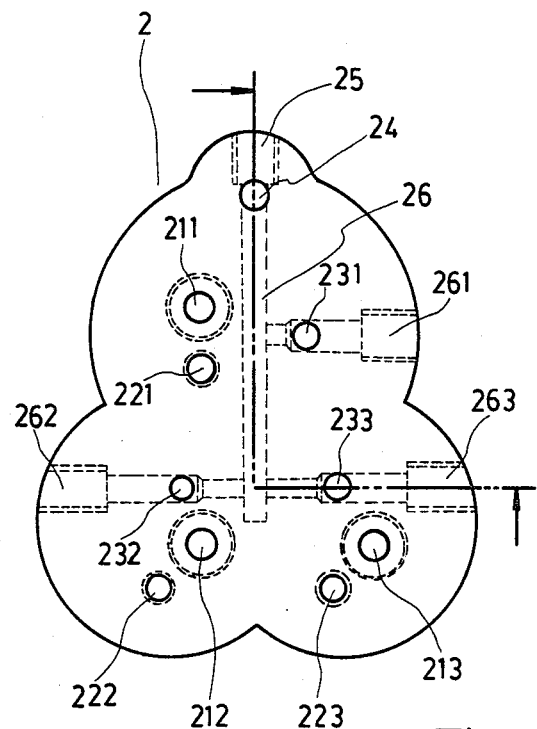
Fig. 4-A
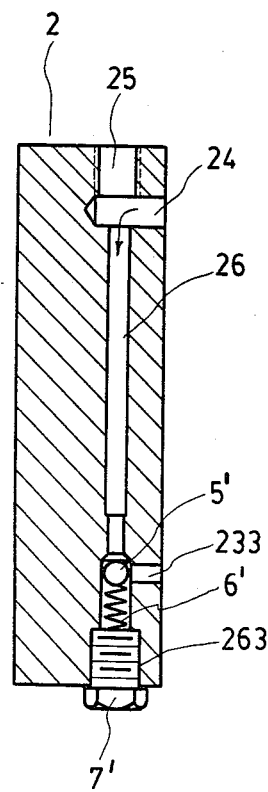
Fig. 4-B

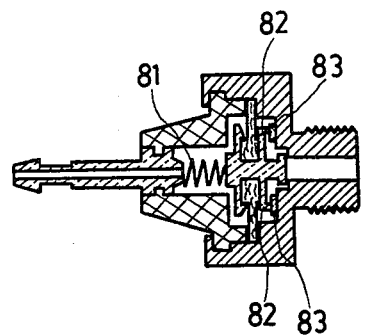
Fig. 4-D
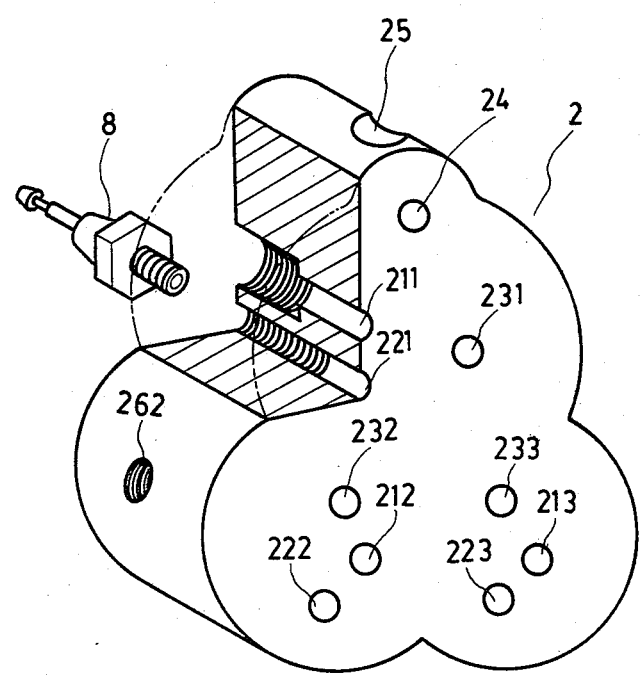
Fig. 4-C

SEPARATE 3-CYLINDER SYSTEM OF BRAKE FLUID FOR AUTOMOBILE SAFETY

BACKGROUND OF THE INVENTION

Nowadays, the hydraulic brake system for the vehicle can be generally classified into single-cylinder brake systems and dual brake systems. The brake fluid in the conventional piston pressure system in the brake master-cylinder flows to each brake wheel cylinder upon application of the brake pedal. The car will incline forward in conventional systems since the shorter brake tube leading to the front wheel causes a quicker resonse in the front wheel during braking. In an emergency braking situation, vehicle wavering, zig-zagging, and overturning are possible. As far as the conventional single-cylinder brake system is concerned, the vehicle will lose braking function thereby unfavorably and greatly affecting the driving safety thereof when the brake tube is damaged, such as, by a breach and leakage. With regards to the dual brake system, when the brake tube in either brake system is damaged, such as, by breach and leakage, one of the brake systems can still perform the braking function. However, the overlapping pistons in the same master cylinder considerably descrease the pressure for pressing the brake fluid so that the overall brake system cannot entirely develop the proper braking function.

SUMMARY OF THE INVENTION

In view of the above problems with conventional brake systems, it has been found that an improved structure for hydraulic brake systems is possible. A pressing cylinder according to the present invention is installed between the main brake tube of the conventional brake master cylinder and is characterized by having a warning system and the auxiliary brake tube device. More particularly, the pressing cylinder of the present invention includes three cylinders so that the brake tube leading to the front and rear wheels forms 3 separate brake controls. Thus, the brake system of the present invention exhibits sensitive and even braking function. When any one of the three separate brake tubes is damaged, such as, by breach and leakage, the braking operation of the other two brake tubes will not be adversely affected. The undamaged brake tubes can, thus, consecutively develop the braking function of the vehicle thereby assuring driving safety.

The present invention is further characterized by generating a warning function when any one brake tube in the brake system is malfunctioning so that the vehicle operator can distinguish and identify which brake tube is damaged and can, thus, engage in repair.

BRIEF DESCRIPTION OF THE DRAWINGS

FIG. 2A is a front view, partly in section, of the pressing cylinder body of the present invention;

FIG. 2B is a sectional view of the pressing cylinder body as noted in FIG. 2A;

FIG. 3A is a front view of structure of the panel of the present invention;

FIG. 3B is a sectional view of the panel of the depicted in FIG. 3A;

FIG. 4A is a front view of the lid of the present invention;

FIG. 4B is a sectional view of the lid depicted in FIG. 4A;

FIG. 4C is a perspective view partly in section of the lid depicted in FIG. 4A;

FIG. 4D is a sectional view of a hydraulic switch; and

DESCRIPTION OF THE PREFERRED EMBODIMENT

Figure 1:
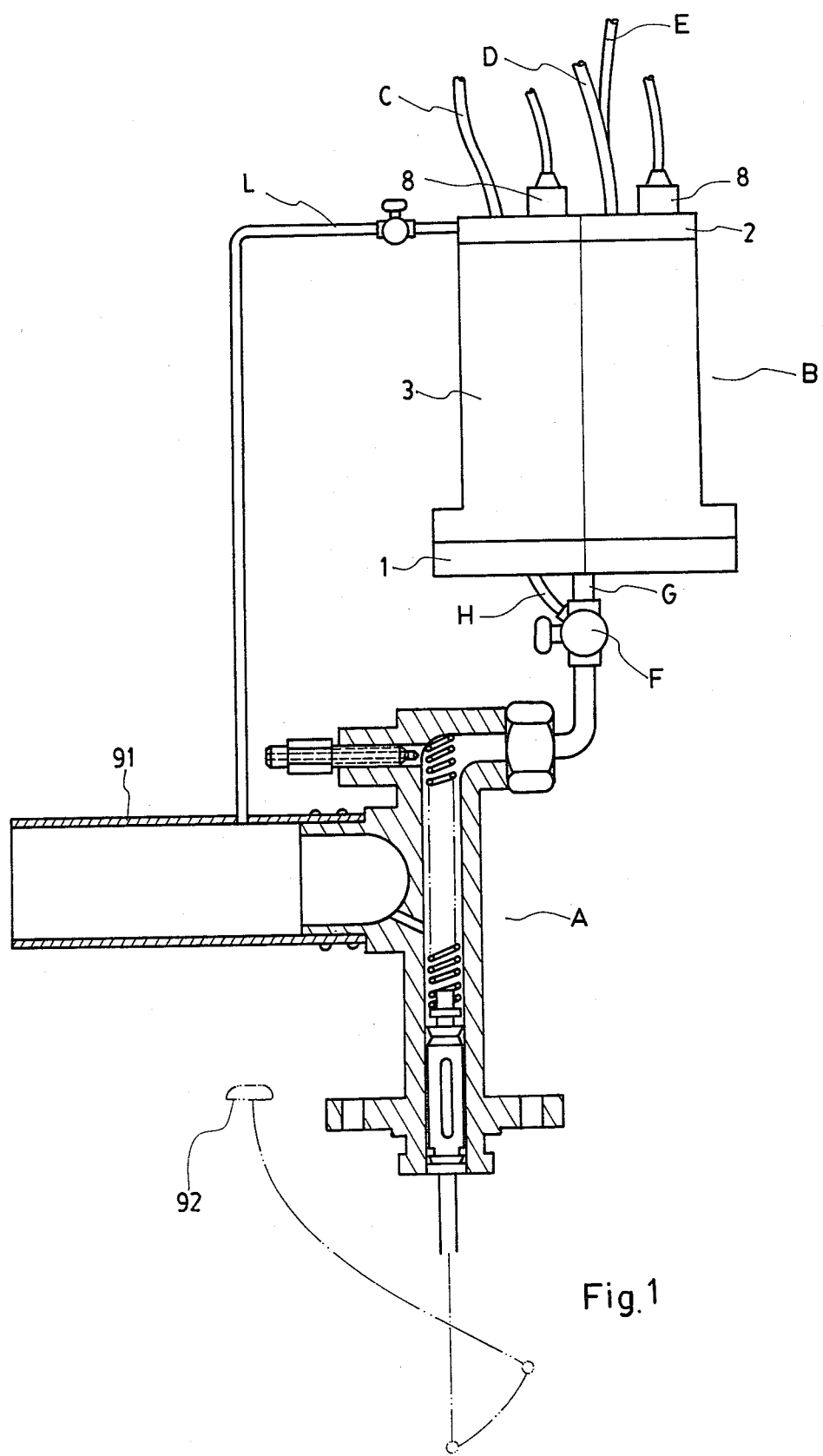
FIG. 1 is a schematic view of the pressing cylinder of the present invention installed in the main brake tube of a conventional brake master-cylinder.

As shown in FIG. 1 the pressing cylinder (B) of the present invention is installed the main brake tube of a conventional brake master-cylinder (A). The pressing cylinder (B) installed in the proper position on the main brake tube of brake master-cylinder (A) include a control valve (F) for controlling the brake fluid to and from the pressing cylinder (B) thru the main fluid tube (G). The direction of the brake fluid flowing in the main brake tube can be changed by rotating control valve (F) so that the brake fluid can flow into the repair fluid passageway (34) in the pressing cylinder (B) via the repair brake tube (H). In such an arrangement, the present invention can be used in a repair mode in the event of a brake malfuntion.

Pressing cylinder (B) consists of a panel (a), a lid (2) and a pressing cylinder body (3). The panel (1) and lid (2) are respectively fixed on opposing sides of the pressing cylinder body (3 with conventional screws (not shown).

As shown in FIG. 2A and 2B the pressing cylinder body (3) consists of a front cylinder (31) two rear cylinders (32) and (32'), and a repair brake fluid passageway (34) disposed above the front cylinder (31). Three cone section ring slots (311), (321), and (321') having a larger inner diameter are provided at the cylinder wall adjacent the rear end portion of the front and rear cylinders (31), (32) and (32'), respectively (see the right end portion of the pressing cylinder body as shown in FIG. 2A). A flange (35) is provided on the outer ring of pressing cylinder body (3) at the front end of the front and rear cylinders (31), (32) and (32'), respectively, and each is set in a proper position on the flange (35). A steel ball (5) and a spring (6) are sequentially positioned in the cascade screw hole (351) and fixed by a screw therein. The end of the cascade screw hole (351) is a small cone section designed to keep the steel ball (5) positioned in the hole (351). The pistons (41) (42) (42') for pressing the brake fluid are respectively positioned in the front and rear cylinders (31), (32), and (32'). The structure of these pistons are characterized by the inward cone sections (411), (421), and (421') at one end thereof and the piston rings (412), (422), and (422') preferably constructed of bakelite, in th ring slots at the other end thereof. Oil seals (413) (414), (423) (424), (423') (424') are respectively set in the two inner ring slots of the piston and the openings of opposing oil seals are respectively toward the left and right ends so as to separate the brake fluid on the two sides of pistons (41) (42) (42').

The pistons (41), (42), and (42') in the cylinders (31) (32) (32') will advance a proper distance toward the right side in response to brake fluid pressure applied on the left side. Conversely, pistons (41), (42), and (42') will move toward the left side in response to brake fluid pressure applied on the right side. The pistons will return to their original postions by means of a "catch action" generated by the cone sections (411), (421), and (421') and positioned steel ball (5). A convexity (415), (425), and (425') at the front and rear ends of pistons (41) (42) (42') is provided to define a distance between each of the pistons (41), (42), and (42'), panel (1), and lid (2), respectively, so that the end surface of pistons (41), (42), and (42') at the maximum stroke limit will neither contact panel (1) or lid (2) nor generate an adhesive phenomenon which will lead to difficult actuation by the brake fluid.

The separate brake tube (C) of front cylinder (31) controls the simultaneous braking of the front two wheels of the car, and brake tubes (D) and (E) of rear cylinders (32) and (32'), respectively, separately control the braking of the rear two wheels of the car. (The front two wheels are under control by same one cylinder so far as the present invention is concerned. If the front two wheels are respectively controlled by separate cylinders and should any one brake tube thereof become damaged, such as, by breach or leakage, the resistance applied to the front two wheels will be different from each other and the car during braking will incline or possibly over-turn. Since the car in movement has a forward impetus, in an emergency braking situation, if only one of the front two wheels has braking function but the other one cannot generate braking function, one side of the vehicle body will have to incline forward thereby creating hasty turn of the car. In such an occurrence, the car is difficult to control but is easily overturned. The braking function of the two rear wheels is respectively under the control of separate cylinders. Since the rear wheels of the car are normally driven via the differential, in the case of one rear wheel losing braking function, the braking force of the other rear wheel having braking function is conveyed to the differential along the transmission shaft and to the rear wheel without braking function. Thus, the energy of motion of the rear wheel without braking function can be simultaneously conveyed to the differential through the wheel transmission shaft. Therefore, the energy of motion of one rear wheel without braking function and the braking force of the other rear wheel having normal braking function can be mutually checked and neutralized through the differential so that the two rear wheels can mutually generate braking function.)

The caliber and volume of the front cylinder (31) is larger than each of the two rear cylinders (32), (32'). When the piston presses brake fluid into the pressing cylinder (B), the hydraulic response in the rear cylinders (32), (32') having smaller calibers and volumes is quicker than the response of the front cylinder. Thus, the smaller caliber and volume provide quicker transmission action. Therefore, the rear wheels having the quicker hydraulic action will be more sensitive and will thus generate the braking function and the friction resistance with the land surface in a more even manner during the moment of braking.

As show in FIG. 3A, and 3B, it is seen that the panel (1) has a repair brake fluid (11) and a main brake fluid hole (12). The repair brake fluid intake hole (11) penetrates the panel (1). One end of this hole is connected to the repair brake tube (H) and the other end thereof is connected to the repair brake fluid passageway (34) of pressing cylinder body (3). The main brake fluid hole (12) does not completely penetrate panel (1) but terminates inside the panel into discrete branches of three brake fluid intake holes (121), (122), and (123), respectively. Each intake hole (121), (122), and (123) leads to the front cylinder (31) and each of the two rear cylinders (32), (32'), respectively of the pressing cylinder body (3). Main brake fluid hole (12) at the end opposite the three brake fluid holes (121), (122), and (123) is connected to main brake tube (G). The exhaust port (13) penetrates the panel (1) and is connected to the main brake fluid (12) inside panel (1). An exhaust cotter is set in the exhaust port (13).

The brake fluid intake holes (121), (122), and (123) are positioned in the centers of cylinders (31) (32) (32') of the pressing cylinder body (3) so that the brake fluid, while flowing into various cylinders (31) (32) (32') from various brake fluid intake holes (121) (122) (123), will not be blocked by the convexity (415) (425) (425') at the front end of pistons (41) (42) (42'). Thus, the undesirable phenomenon of difficult brake fluid intake is prevented.

As shown in FIG. 4A, 4B, and 4C the lid (2) has three brake fluid discharge holes (211), (212), and (213), three cotter holes (221), (222), and (223), three auxiliary brake fluid intake holes (231), (232), and (233) and one cotter hole (25). The brake fluid dicharge holes (211), (212), and (213) are designed to permit the brake fluid pressed out of the front cylinder (31) and each of the two rear cylinders (32), (32') of pressing cylinder body (3) to flow to the brake tubes (C), (D), and (E). The three cotter holes (221), (222), and (223) are designed to permit the brake fluid pressed out of the front cylinder (3) and two rear cylinders (32) (32') to flow in. Each cotter hole is provided with a threaded hydraulic switch (8) in a position outside the lid (2). Each hydraulic switch (8) responsively acts under hydrauic pressure and is connected to the brake light thereby forming a series circuit connection with the parallel circuit of the buzzer and warning light installed in the driver's cab. When the hydraulic pressure applied to the hydraulic switch (8) is insufficient, the automatic return spring (81) of switch (8) permits the junction points (82), (83) to contact each other connect to restore (e.g., the closed "ON" state) thereby operating the buzzer and warning light. (The hydraulic switch (8) is closed (ON) in the event of no hydraulic pressure but is open (OFF) if there is sufficient hydraulic pressure.)

As shown in FIG. 4-B, the auxiliary brake fluid intake holes (231), (232), and (233) do not penetrate through lid (2) but are interconnected with each other and the repair brake fluid hole (24) via brake fluid passageway (26). The repair brake fluid hole (24) does not penetrate through lid (2) and is connected to the repair brake fluid passageway (34) in the pressing cylinder body (3). A cotter hold (25) in communcation with the repair brake fluid hole (24) is provided on the outer peripheral edge of lid (2) with a one-way valve (K) connected through the auxiliary brake tube (L) to the fluid tank (91) of brake master cylinder (A) (see FIG. 1).

The auxiliary brake fluid holes (231), (232), and (233) are provided with cascade screw holes (261), (262), and (263), respectively on the outer peripheral edge of lid (2). A steel ball (5') and a spring (6') are respectively installed and fixed in place by an adjustable screw (7'). Due to the pressure of the properly adjusted spring (6') pressing the steel ball (5') over the aperture defined by passageway 26, a oneway valve is formed to permit brake fluid to flow into cylinders (31), (32), and (32') from the auxiliary brake fluid holes (231), (232), and (233), respectively. However, the brake fluid cannot flow to the brake fluid passageway (26) from the auxiliary brake fluid holes (231), (232), and (233) due to steel balls (5') blocking the opening thereof by virtue of spring (6').

The operation of the present invention is further described below:

When the vehicle operator presses on brake pedal (92) (see FIG. 1), the piston in brake master cylinder (A) compresses the brake fluid. The brake fluid responsively flows to the pressing cylinder (B) via the main brake tube (G) and into the pressing cylinder body (3) along the three separate brake tubes and the brake fluid intake holes (121), (122), and (123) after first passing through the main brake fluid hole (12) of panel (1). As mentioned above, piston (41), (42), and (42') are installed in front cylinder (31) and each of the two rear cylinders (32), (32'), respectively in the pressing cylinder body (3). The brake fluid flowing into the respective cylinders through the brake fluid intake holes (121), (122), and (123), will press upon pistons (41), (42), and (42') thereby responsively moving to press the brake fluid at the other end thereof. Thus, the brake at the other end will flow to the brake wheel cylinders of the front and rear wheels through brake tubes (C), (D), and (E), respectively so that the wheel cylinders will expand responsively expanding the brake lining to generate friction with the brake drum and provide the desired braking effect. When the brake pedal (92) is released, the piston in the master cylinder (A) and the brake lining in the front and rear wheel brake drum will contract by virtue of the spring tensil force so as to press the brake fluid back into the brake tubes (C), (D), and (E). The piston in the master cylinder (A) and the pistons (41), (42), and (42') in the pressing cylinder (b) will thereby return to their respective original positions for performing the next braking operation as desired.

The warning device of the present invention can immediately generate visual and audio warning signals so as to alert the operator of the necessity for remedial measures to ensure safety when the brake tubes (C), (D), and (E) are leaking. The structure of this device has been described in detail hereinbefore, therefore the operational principle thereof is described in detail as follows:

If the brake fluid passageway on brake tube (C), for example, leading to the front wheel is not broken, leaking or damaged, we tramp on the brake pedal (92), the pistons (42), (42') in the pressing cylinder (B) will normally advance a proper distance to press the brake fluid at the other end for braking the rear wheels when brake pedal (92) is operated. Under normal conditions, piston (41) will also advance. However, damage to brake tube (C) such as, leakage occurs, the piston (41) under hydraulic pressure advances steadily without resistance so that the piston bakelite ring (412) contacts the cone section ring slot (311) due to the expansion force of said ring. Should the vehicle operator release the brake pedal under normal conditions, the brake tubes (D) and (E) having hydraulic pressure therein will press the pistons (42) (42') back to their normal positions. However, in the condition described above, the brake tube (C) cannot generate sufficient hydraulic pressure action due to the leakage or damage. Thus, piston (41) cannot return to its original position. In this state, if the brake pedal (92) is operated once again, the rear two-wheel brake tubes (D) and (E) react normally and can perform normal braking action. However, the front wheel brake tube (C) without brake fluid for generating pressure cannot transmit the hydraulic pressure of the master cylinder (A) to the front brake wheel cylinders and, thus, loses braking effect.

Figure 5:
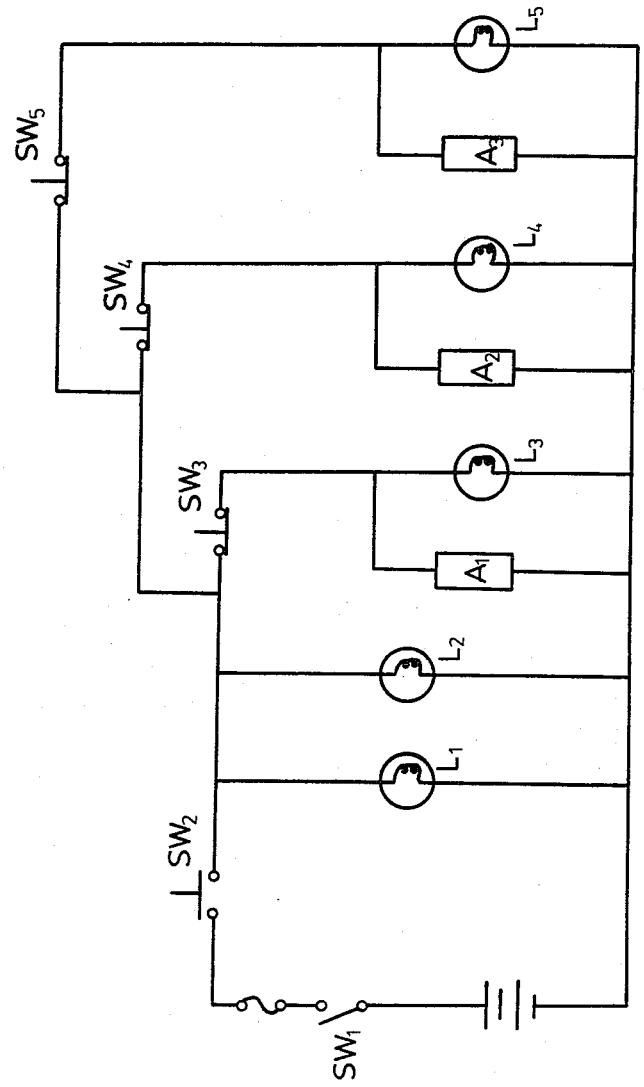
FIG. 5 is a circuit diagram of the brake warning system of the present invention.

Normally, when a car is braked an electrical circuit is closed to light the brake light. According to the present invention, the brake light is connected to the hydraulic pressure switch (8) of pressing cylinder (B). Thus, when piston (41) cannot press the brake fluid to the hydraulic pressure switch (8), the buzzer and warning light to alert the vehicle operator and to identify the brake tube that has malfunctioned, e.g. in the example above, brake tube (C). The circuit diagram for this purpose as shown in FIG. 5 is described in detail below:

The control circuit consists of a power source, a master switch (power source switch) $SW_1$, a fuse, a brake switch $SW_2$ (brake pedal), three hydraulic pressure switches $SW_3$, $SW_4$, $SW_5$ (i.e. individual hydraulic pressure witches (8), two brake lights $L_1$, $L_2$, three warning lights $L_3$, $L_4$, $L_5$, and three buzzers $A_1$, $A_2$, $A_3$. The three hydraulic pressure switches $SW_3$, $SW_4$, and $SW_5$ are normally closed (N.C.) and form a mechanical interlock through the hydraulic pressure control of pressing cylinder (B) and the brake switch SW2, respectively. When master switch $SW_1$ is closed (i.e. the driver opens the ignition switch with the ignition key), the brake switch $SW_2$ (brake pedal) is pressed down, the junction points of hydraulic pressure switches $SW_3$, $SW_4$, and $SW_5$ also open, and the left and right brake lights $L_1$, $L_2$ also are (ON). When the brake switch $SW_2$ is released, all these members restore their original state. If the brake tube (C), for example, is leaking, the hydraulic pressure switch $SW_3$ will be under no hydraulic pressure when the brake switch $SW_2$ is pressed down. Thus, the circuit is closed and the warning light $L_5$ and buzzer $A_1$ connected thereto generate the desired warning response.

When the warning system of warning light $L_3$ and buzzer $A_1$ installed in the driver's cab alerts the driver to brake line damage, such as, should brake tube (C) be damaged, the drive can quickly engage in repair. This feature of the present invention avoids the danger of not being aware of potential brake trouble and of wasting time in pinpointing the trouble once it is apparent. To effect repair, the control valve (F) is rotated to change the flow direction of brake fluid in main brake tube (G) into repair brake tube (H). The exhaust cotter in the exhaust port (13) of panel (1) and the exhaust cotter in the brake wheel cylinder of brake tube (C) are then loosened. At this time, pressing on brake pedal (92) permits brake fluid to flow to the repair brake fluid intake hole (24) of lid (2) through the repair brake fluid passageway (34) of pressing cylinder (B). Since the piston (41) in the front cylinder (31) is caught at the cone section ring slot (311), the brake fluid flowing into the repair brake fluid intake hole (24) and to the brake fluid passageway (26) will press the positioned steel ball (5') in the auxiliary brake fluid intake holes (231)(232)(233) thereby pressing the spring (6') to vacate a space to permit the brake fluid to flow back to the front cylinder (31), brake tube (C) and brake wheel cylinder. Thus, piston (41) is withdrawn from the cone section ring slot (311) so as to free the piston (41) to return it to its original position. At this time, some air and partial brake fluid will escape from the opened exhaust cotter. Thus, after piston (41) returns to its original position and the brake fluid fills the repair brake tube (C), the exhaust cotter is tightly locked. After repair, the control valve (F) is rotated once again to change the repair brake tube (H) into its original flow direction with main brake tube (G). The positioned steel ball (5') of lid (2) being under no direct pressure of brake fluid from repair brake tube (H) will once again return to its original position by virtue of the elastic force of spring (6') so as to block the auxiliary brake fluid intake holes (231), (232), and (233), respectively, i.e. to permit the brake system to entirely restore to its normal operating positions.

In addition, a one-way valve (K) installed in the cotter hole (25) above the lid (2) is connected in the auxiliary brake tube (L) so that the brake fluid in the fluid tank (91) can flow into the brake fluid passageway (26) inside the lid (2). (So far as conventional wheel braking of the car in general is concerned, the brake fluid is pressed by master cylinder (A) to flow from master cylinder (A) to brake wheel cylinders to force the brake wheel cylinders to expand and to let the brake lining and brake drum thereof generate friction so as to achieve braking. When the brake pedal is released, the brake fluid can return to the fluid tank (91) of master cylinder (A) by virtue of spring biasing in the master cylinder (A) pusing back the piston in the master cylinder (A) and contracting spring biasing of the brake wheel cylinders.) The present invention also depends on the biasing force of the two springs to force the brake fluid to return to the fluid tank (91) of master cylinder (A). Normally, the force of stretched spring in the brake wheel cylinder must be larger when the spring begins to contract and smaller when the spring is restored to its original state. This is true since the brake fluid has a partial consumption and fails to reach a saturation state while operating. Therefore, the present invention has an additional auxiliary brake tube (L) to ensure that the brake fluid can be maintained at a predetermined quantity while breaking and will not decrease to weaken its braking function.

As mentioned above, the pistons (41), (42), and (42') are installed in the pressing cylinder body (3). When the spring of a brake wheel cylinder forces the brake fluid in the brake wheel cylinder to return to the pressing cylinder body (3) via brake tubes (C), (D), and (E), the pistons (41), (42), and (42'), respectively, at the right end of pressing cylinder body (3) must be gradually pushed to the left end thereof. However, the brake fluid pressure must be also larger in order to have enough force to push pistons (41), (42), and (42'), and to let the cone section edges (411), (421), and (421') of the pistons contact the steel ball (5). Thus, spring (6) presses the steel ball (5) to force the pistons (41), (42), and (42') to quickly slide the pistons toward the left end. Some the brake fluid will be consumed during operation. The suction generated while pistons (41), (42), and (42') are quickly sliding toward the left permit the brake fluid in the fluid tank (91) of master cylinder (A) to flow into front and rear cylinders (31), (32), and (32') from auxiliary brake fluid intake holes (231), (232), and (233) via auxiliary brake tube (L), brake fluid passageway (26), and steel ball (5') so as to supplement the consumed brake fluid and to keep the predetermined quantity of brake fluid at the right end of pistons (41)(42)(42'). In such a manner the front and rear cylinders (31), (32), and (32') can adequately develop braking functions.

We claim:

1. A pressing cylinder adapted to be connected to the master brake cylinder of an automobile braking system and for independently transmitting fluid pressure to the front wheel cylinders and right and left wheel cylinders in response to manual operation of an automobile brake pedal to effect braking action of said automobile, said pressing cylinder comprising in combination:

body means defining a front cylinder and right and left rear cylinders, said front cylinder having a larger bore than each of said right and left rear cylinders, said body means including piston means slidably and reciprocably engageable in each of said front cylinder and right and left rear cylinders, said piston means including sealing means sealingly engageable with said front cylinder and left and right rear cylinder defining means for separating each of said front cylinder and said right and left rear cylinders into a fluid receiving chamber for receiving fluid from said master cylinder and a fluid discharge chamber for discharging fluid to said front wheel cylinders and said right and left rear wheel cylinders, respectively, in response to manual operation of said brake pedal;

first means covering said fluid receiving chamber including means defining a fluid receiving passageway, one end thereof for connection to said master cylinder, and the other end thereof for concurrently distributing brake fluid from said master cylinder to said front cylinder and said right and left rear cylinders; and second means covering said fluid discharge chamber including means defining fluid discharge passageways in operative communication with said front cylinder and said right and left rear cylinders for allowing brake fluid to pass therethrough in response to manual operation of said brake pedal and for connecting said pressing cylinder to said front wheel cylinders and right and left rear wheel cylinders respectively.

2. A pressing cylinder as in claim 1 wherein said fluid receiving passageway defining means includes a first passageway portion having one end for connection with said master cylinder, the other end including first, second and third diverging passageway portions in fluid communication with the fluid receiving chamber of said front cylinder and said right and left rear cylinders, respectively.

3. A pressing cylinder as in claim 2 further comprising repair means for supplying repair brake fluid to return predetermined ones of said piston means in said front cylinder and said right and left rear cylinders to their respective operable position.

4. A pressing cylinder as in claim 3 wherein said repair means comprises a repair passageway, diverting means for diverting brake fluid flow from said master cylinder to said repair passageway, and first, second and third one-way valve means associated with each of said front cylinder and right and left rear cylinders, respectively, for allowing brake fluid to flow into said fluid discharge chambers only when said diverting means is positioned to divert brake fluid to said repair passageway.

5. A pressing cylinder as in claim 4 wherein said one-way valve means comprises a spherical member and biasing means for biasing said spherical member to a normally closed position to allow flow of brake fluid only from said repair passageway to said fluid discharge chambers.

6. A pressing cylinder as in claims 1 or 5 further comprising warning means operatively associated with each of said front cylinder and right and left rear cylinders, respectively, for warning the automobile operator of individual brake system failures.

7. A pressing cylinder as in claim 6 wherein said warning means comprises first, second and third hydraulic switch means each operatively associated with said fluid discharge chambers of said front cylinder and left and right rear cylinders respectively, first, second and third indicator means for audibly and visually warning the operator of hydraulic brake damage, and means electrically coupling said first, second and third hydraulic switch means and said first, second and third indicator means, respectively.

* * * * *